Figure 1:
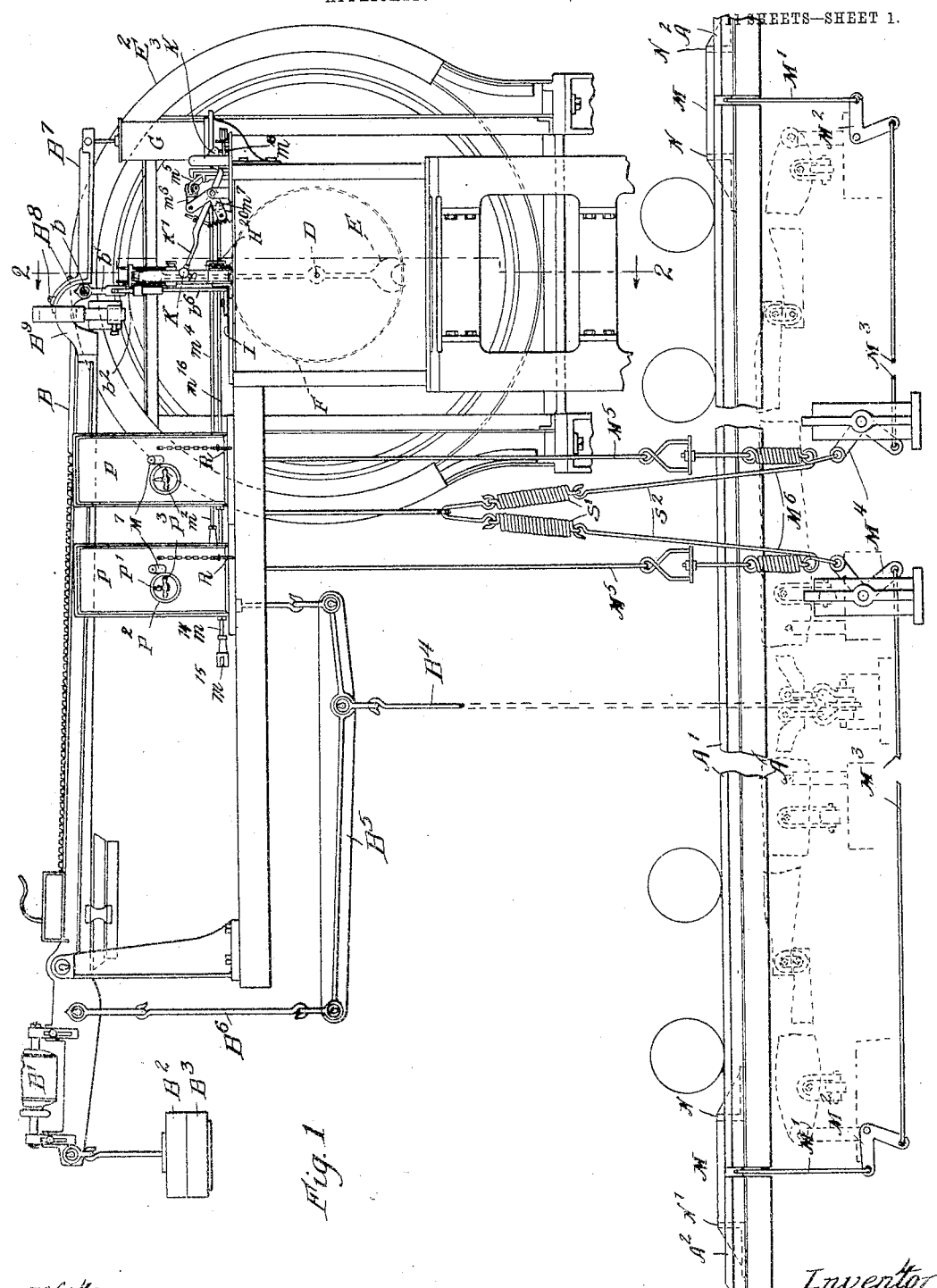

No. 778,359. PATENTED DEC. 27, 1904.
G. GOETZ.
AUTOMATIC INDICATING AND RECORDING CAR SCALE.
APPLICATION FILED MAR. 7, 1904.

11 SHEETS—SHEET 1.

Witnesses:
Wm. Geiger
A. W. Munday

Inventor:
George Goetz
By Munday, Evarts & Adcock,
Attorneys

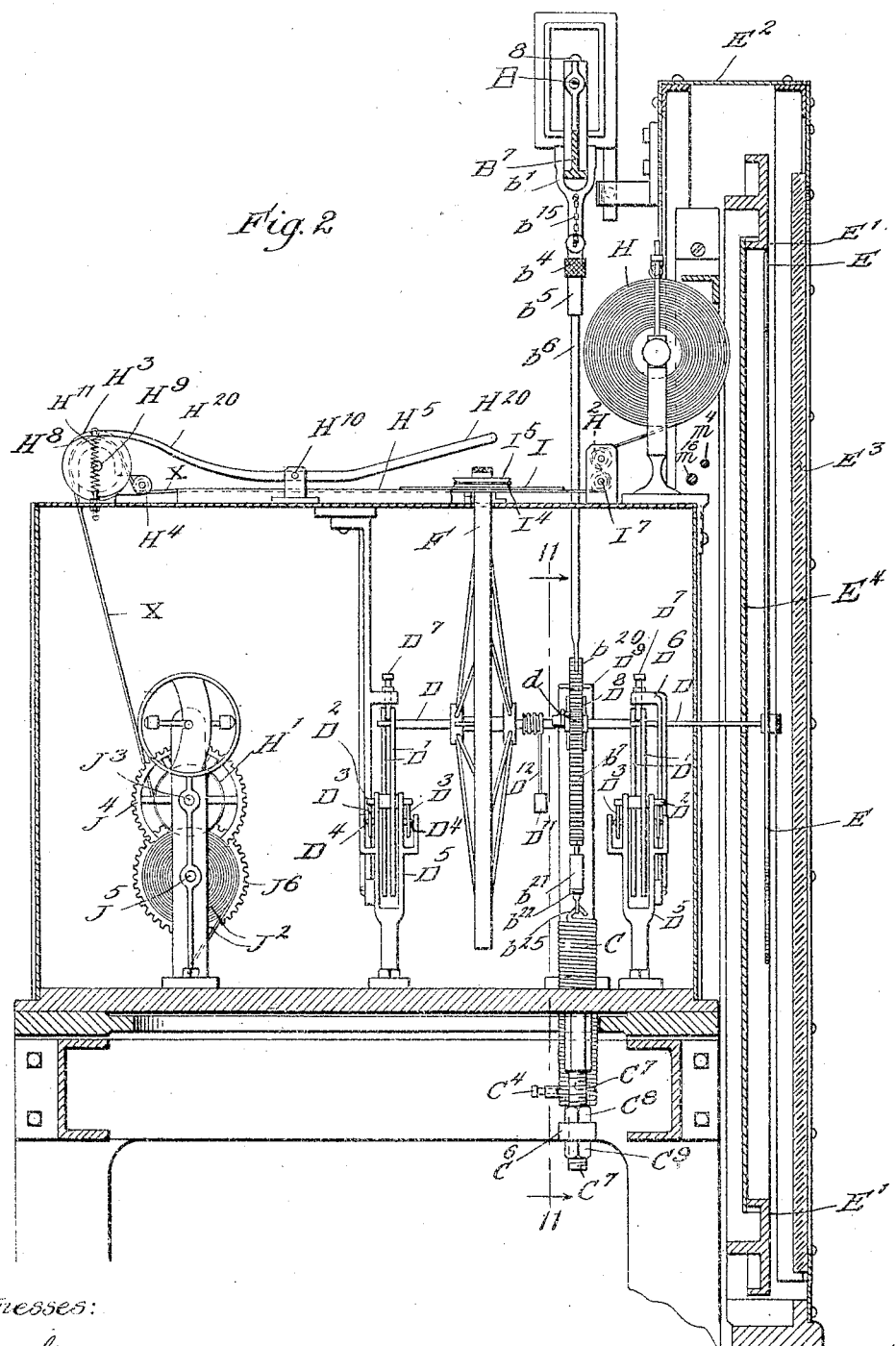

No. 778,359. PATENTED DEC. 27, 1904.
G. GOETZ.
AUTOMATIC INDICATING AND RECORDING CAR SCALE.
APPLICATION FILED MAR. 7, 1904.
11 SHEETS—SHEET 3.
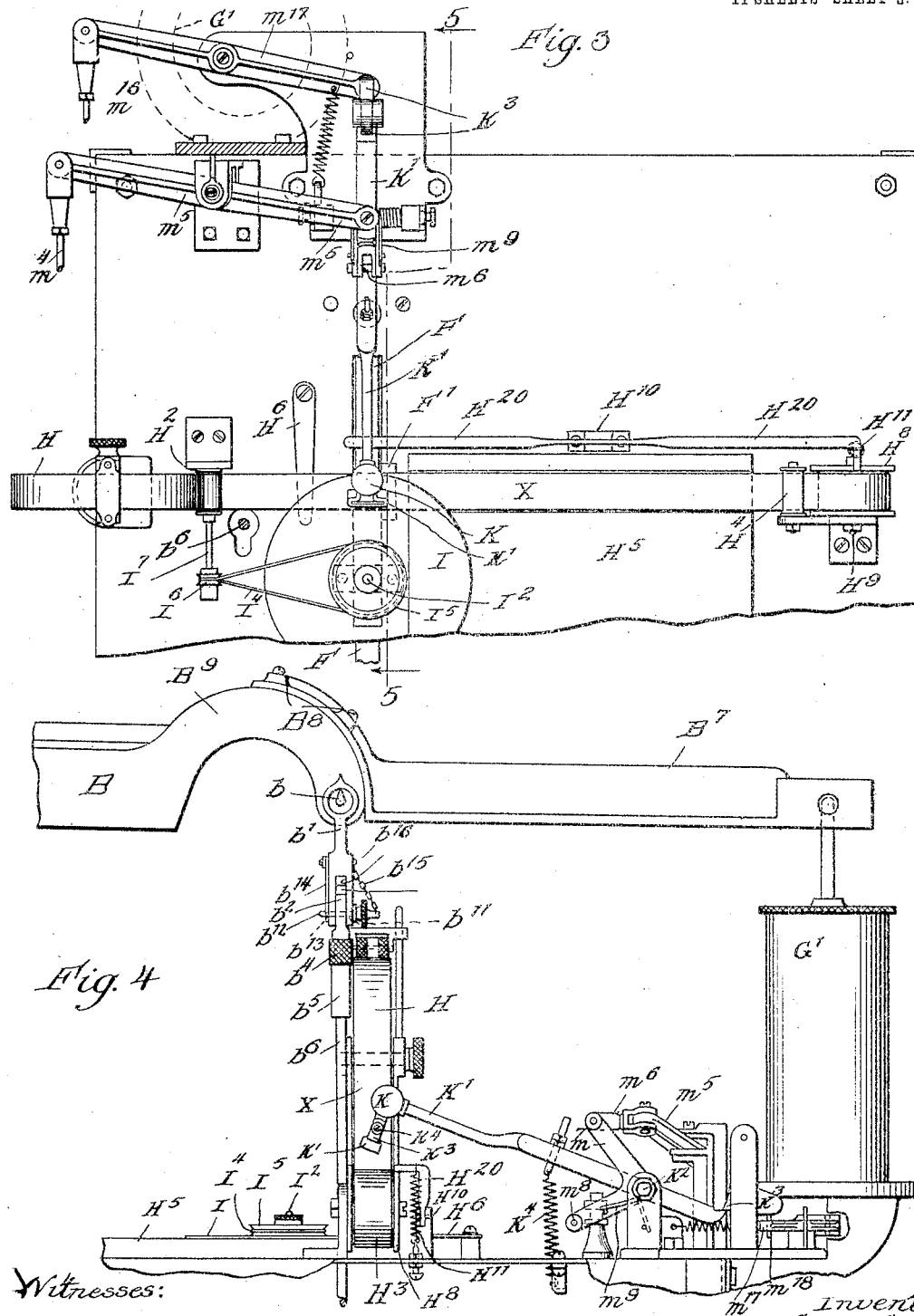
Witnesses:
Wm. Geiger
H. W. Munday
Inventor.
George Goetz
By Munday, Evarts & Adcock,
Attorneys

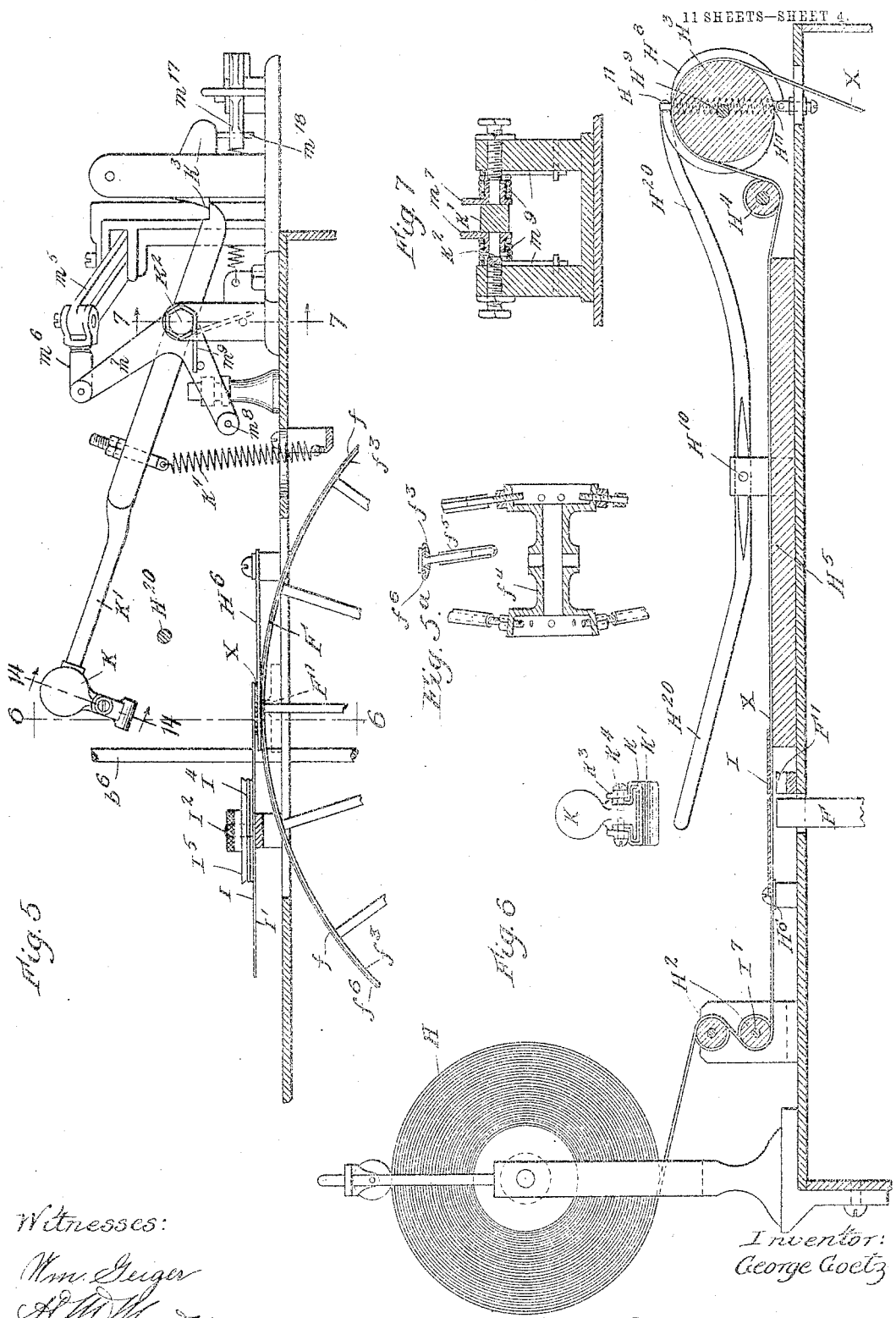

No. 778,359. PATENTED DEC. 27, 1904.
G. GOETZ.
AUTOMATIC INDICATING AND RECORDING CAR SCALE.
APPLICATION FILED MAR. 7, 1904.
11 SHEETS—SHEET 5.
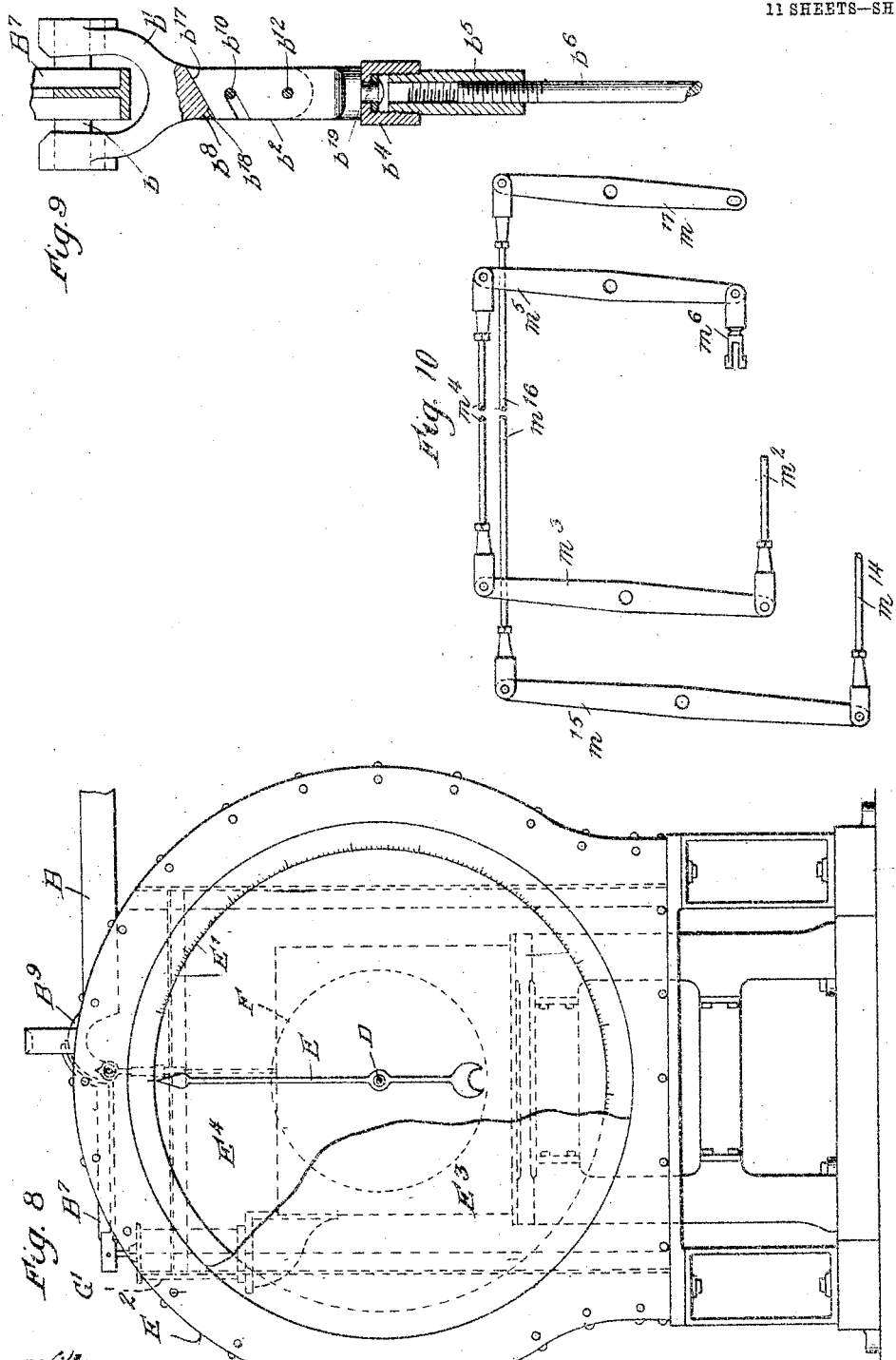

No. 778,359. PATENTED DEC. 27, 1904.
G. GOETZ.
AUTOMATIC INDICATING AND RECORDING CAR SCALE.
APPLICATION FILED MAR. 7, 1904.
11 SHEETS—SHEET 6.
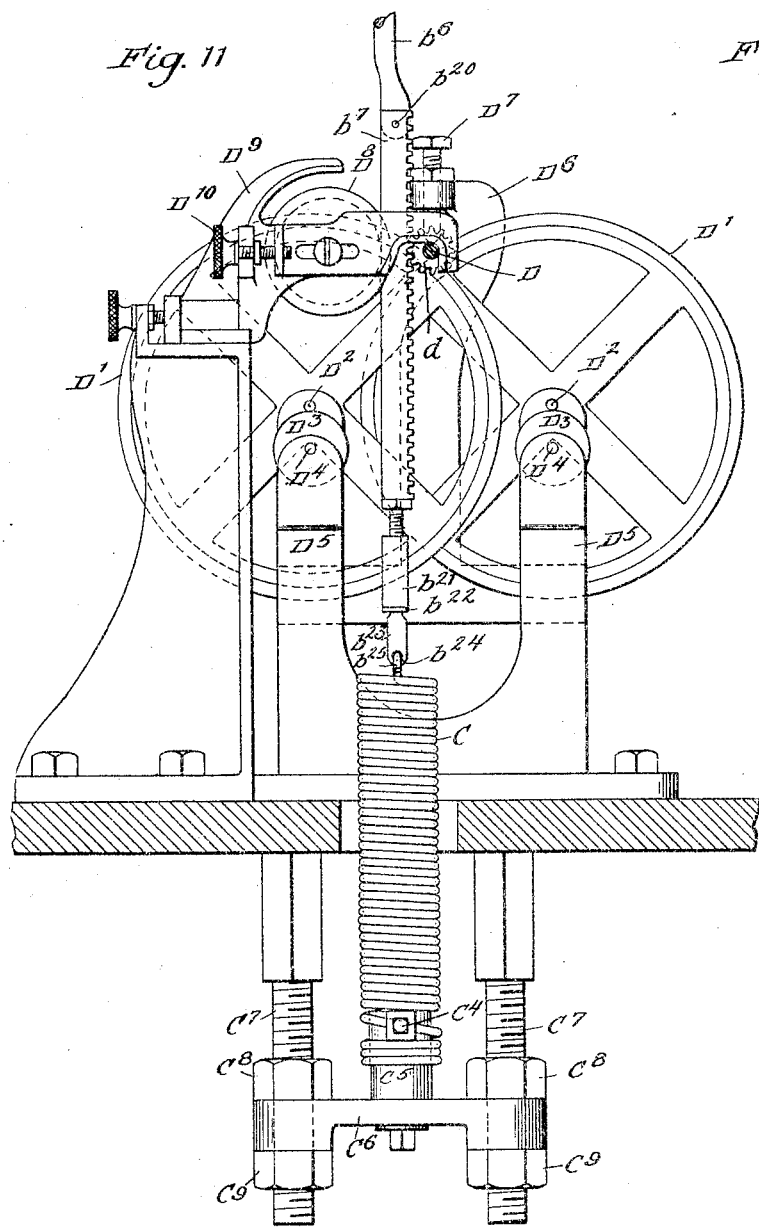
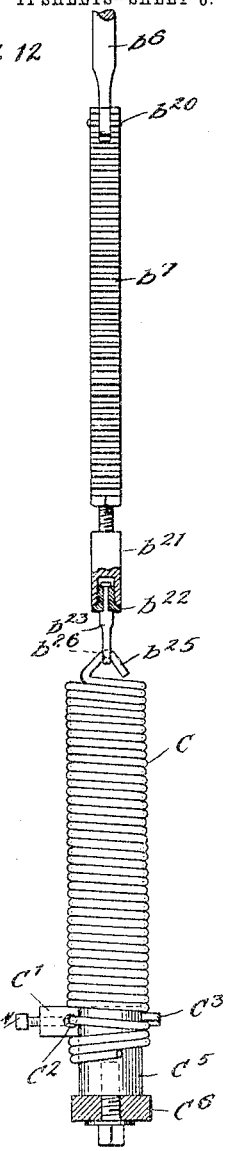

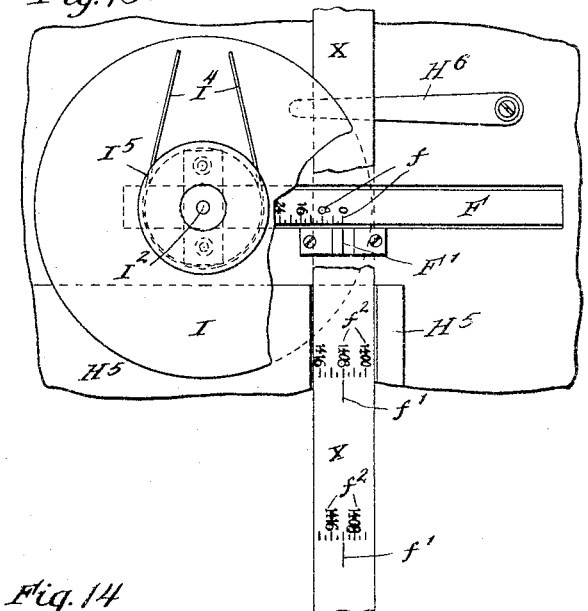
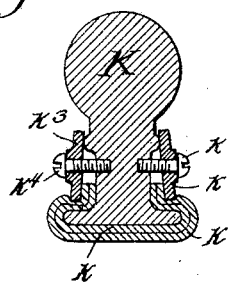
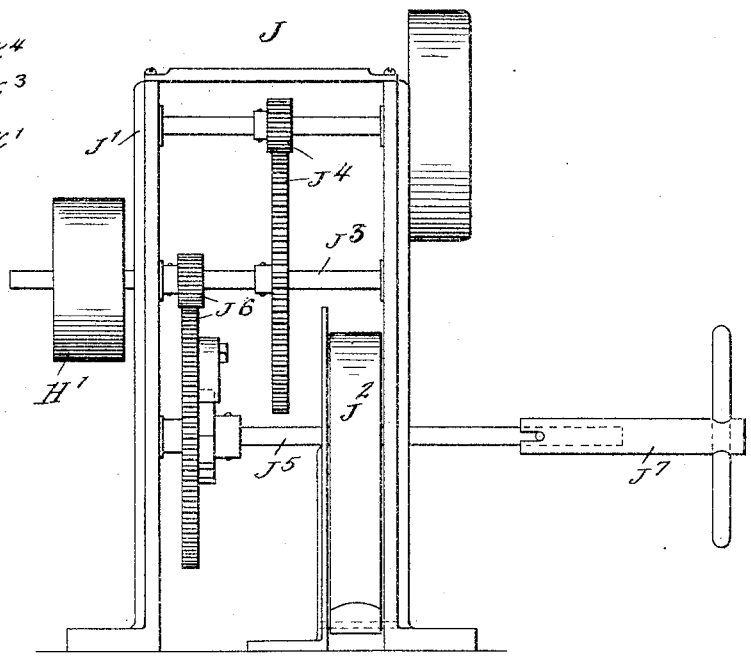

No. 778,359. PATENTED DEC. 27, 1904.
G. GOETZ.
AUTOMATIC INDICATING AND RECORDING CAR SCALE.
APPLICATION FILED MAR. 7, 1904.
11 SHEETS—SHEET 8.
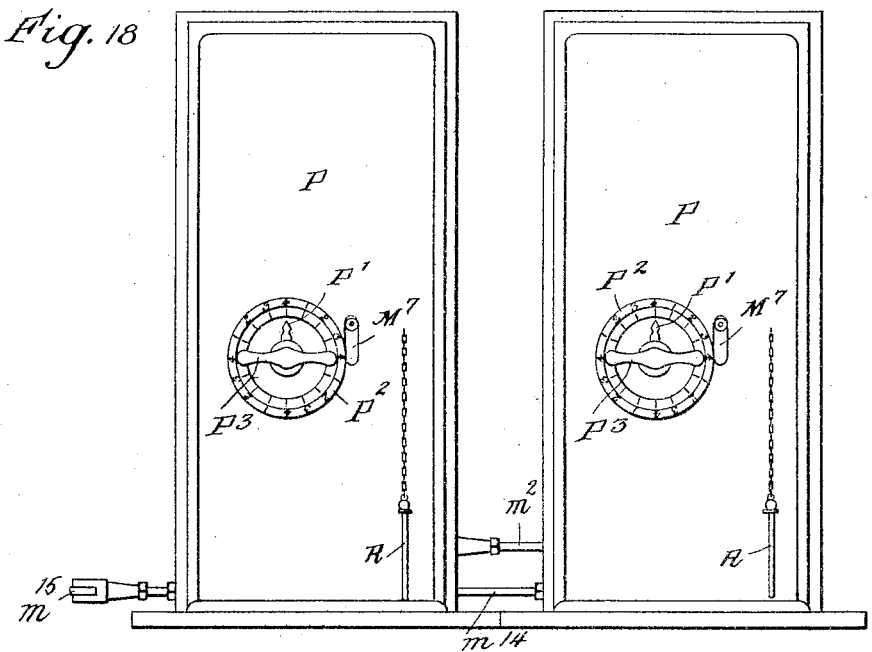
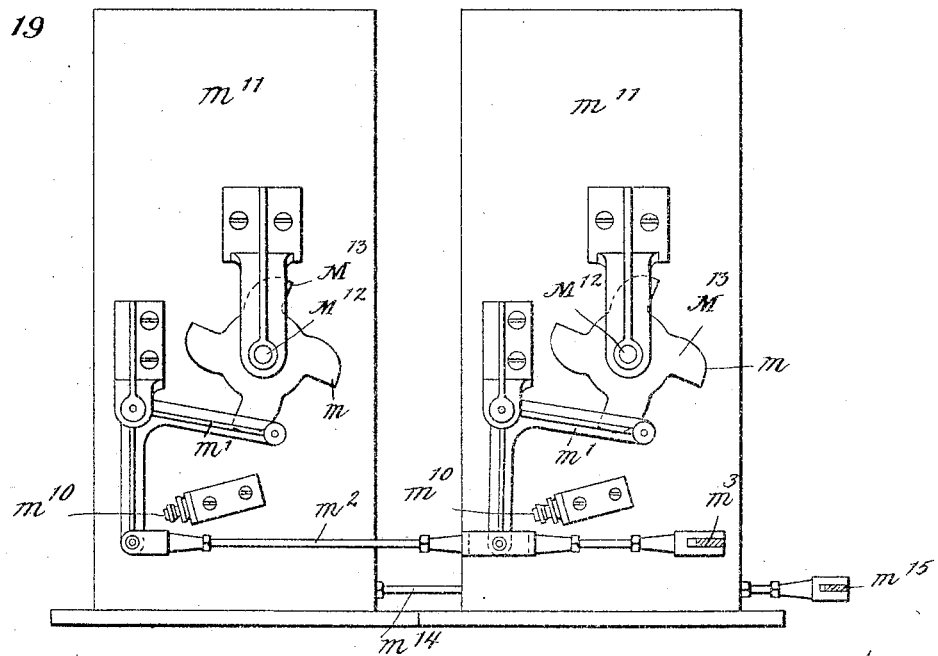

No. 778,359. PATENTED DEC. 27, 1904.
G. GOETZ.
AUTOMATIC INDICATING AND RECORDING CAR SCALE.
APPLICATION FILED MAR. 7, 1904.
11 SHEETS—SHEET 9.
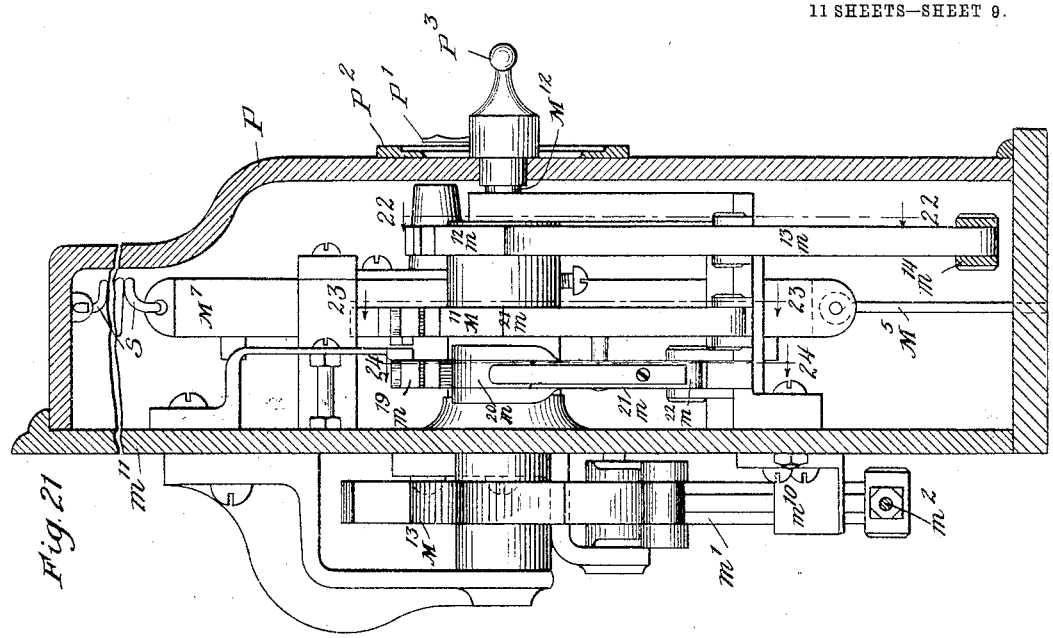
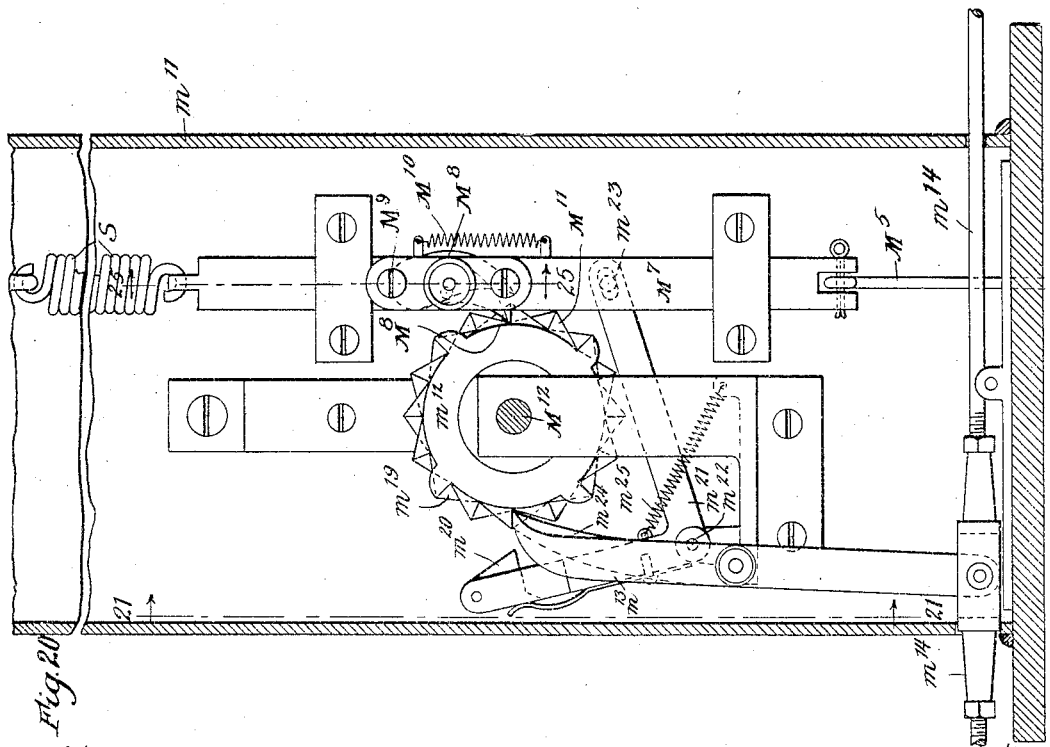
Witnesses:
Wm. Geiger
H. W. Munday
Inventor.
George Goetz
By Munday, Evarts & Adcock,
Attorneys No. 778,359. PATENTED DEC. 27, 1904.
G. GOETZ.
AUTOMATIC INDICATING AND RECORDING CAR SCALE.
APPLICATION FILED MAR. 7, 1904.
11 SHEETS—SHEET 10.
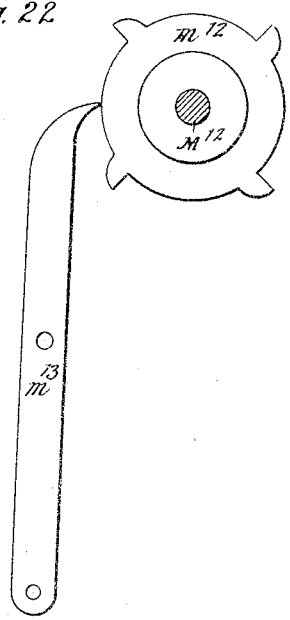
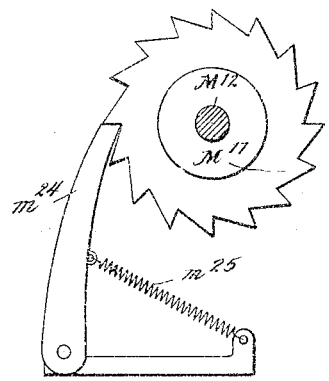
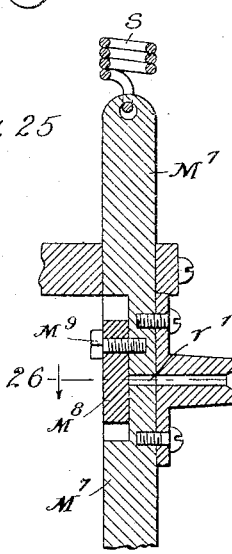
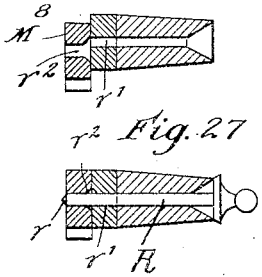
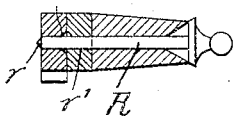
Witnesses:
Wm. Geiger
H. W. Munday
Inventor:
George Goetz
By Munday, Evarts & Adcock.
Attorneys

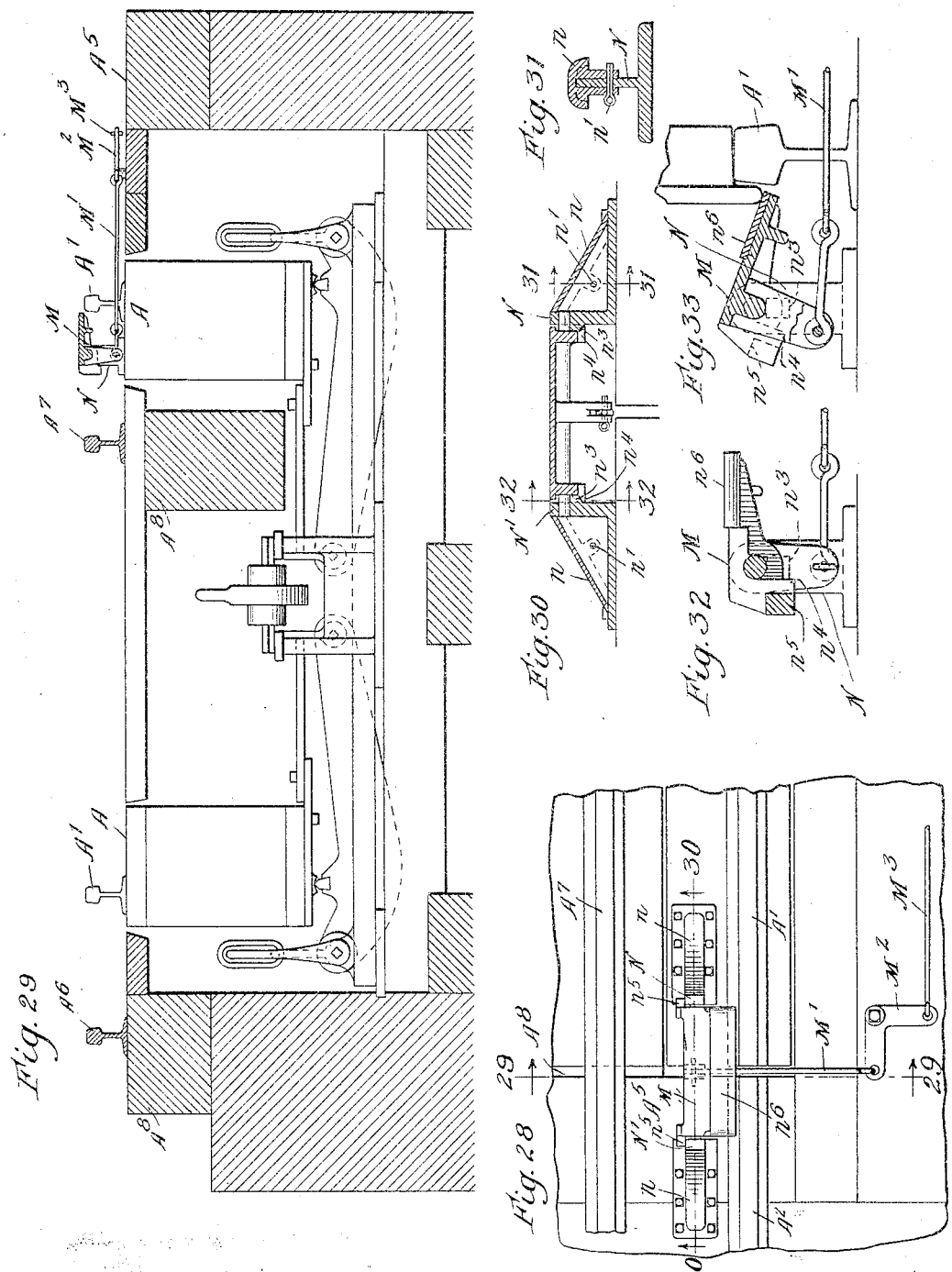

No. 778,359. Patented December 27, 1904.

UNITED STATES PATENT OFFICE.

GEORGE GOETZ, OF CHICAGO, ILLINOIS, ASSIGNOR TO STREETER-AMET WEIGHING AND RECORDING COMPANY, OF CHICAGO, ILLINOIS, A CORPORATION OF ILLINOIS.

AUTOMATIC INDICATING AND RECORDING CAR-SCALE.

SPECIFICATION forming part of Letters Patent No. 778,359, dated December 27, 1904.

Application filed March 7, 1904. Serial No. 196,976.

*To all whom it may concern:*

Be it known that I, GEORGE GOETZ, a citizen of the United States, residing in Chicago, in the county of Cook and State of Illinois, have invented a new and useful Improvement in Automatic Indicating and Recording Car-Scales, of which the following is a specification.

My invention relates to improvements in scales for automatically weighing railway-cars and indicating and recording or printing the weights thereof as a train of cars in continuous motion passes over the scale-platform.

The object of my invention is to provide an automatic weight indicating and recording car-scale of a simple, efficient, and durable construction by means of which the several cars coupled in a train may be automatically weighed and the weight of each car automatically indicated to the attendant and also recorded without stopping the train, the operation of weighing, indicating the weight, and recording the weight of each car being done as the train is drawn over the scale-platform at a reasonable speed.

My invention consists in the means I employ to practically accomplish this object or result—that is to say, it consists, in connection with a railway-track and a car-scale platform having track-rails thereon forming an extension or part of the railway-track, of track-levers at each end of the scale-platform adapted to be operated by the wheels of a car, a scale-beam furnished with an extension or arm, a dash-pot cylinder having a piston connected with the scale-beam extension or arm and furnished with upwardly and downwardly opening valves, a rotatable type-wheel and weight-indicating-finger shaft furnished with a gear, a weight-indicator finger on said shaft, a type or printing wheel on said shaft, a tension-spring, a rack connecting the scale-beam with the spring, a stationary graduated index in coöperative relation with the pointing-finger, a stationary pointer-mark printing-type adjacent to the type-wheel, an impression-hammer, an impression-hammer lever, a trigger for holding the impression-hammer lever in its elevated position, a spring for actuating the impression-hammer, a paper-strip or tape reel, take-up reel and guide-rollers in coöperative relation with the type-wheel, a motor for actuating the take-up reel, a notched disk and lever mechanism for controlling the forward feed of the paper strip or tape, a carbon or other printing-disk interposed between the type-wheel and pointer-type and the impression-hammer, two pawl-carrying slides, one connected with and actuated by each of the track-levers at the ends of the scale-platform, ratchets actuated by said pawl-carrying slides and furnished each with a cam and connecting-lever adapted to raise the impression-hammer lever after a certain number of impulses or movements of either of said ratchets—as, for example, three movements thereof—and to disengage itself from said lever on the next or fourth impulse thereof, said levers being actuated together, so that the mechanism for raising the impression-hammer lever cannot be withdrawn to permit the descent of the impression-hammer lever until both of the ratchets have been given the required number of impulses or movements necessary to indicate that all the wheels of the car are on the scale-platform, the mechanism operating to release the impression-hammer lever while all the wheels of the car are on the scale-platform and before any of the wheels of the car leave the scale-platform, so that the weight will be both indicated to the attendant by the pointer-finger on the stationary scale-index and recorded by the type-wheel on the paper strip or tape automatically while the car is on the scale-platform and as it is drawn continuously over the same in the train of which it forms a part.

My invention also consists in the novel construction of parts and devices and in the novel combinations of parts and devices herein shown or described.

In the accompanying drawings, forming a part of this specification, in which similar letters of reference indicate like parts in all the figures, Figure 1 is a side elevation of a combined weight-indicating and weight-recording car-scale mechanism or apparatus embodying my invention, the view being partly diagrammatic and the intermediate portion of the scale-platform being broken away to enable the main parts of the figure to be made on an enlarged scale. Fig. 2 is a vertical section on line 2 2 of Fig. 1. Fig. 3 is a detail plan view of the printing or weight-recording mechanism. Fig. 4 is a detail end elevation of the parts shown in Fig. 3, showing also the scale-beam. Fig. 5 is a vertical section on the broken line 5 5 of Fig. 3. Fig. $5^a$ is a detail section of the type-wheel. Fig. 6 is a detail section on line 6 6 of Fig. 5. Fig. 7 is a section on line 7 7 of Fig. 5. Fig. 8 is a detail elevation of the weight-indicator dial and pointer. Fig. 9 is a detail elevation, partly in vertical section, of the connection between the scale-beam and the rack which operates the type-wheel or recording-wheel. Fig. 10 is a diagrammatic view showing the connections between the car-indicator mechanism and the trip device of the weight-printing mechanism. Fig. 11 is a detail vertical section on line 11 11 of Fig. 2. Fig. 12 is a detail elevation of the type-wheel-operating rack and the adjustable spring connected thereto. Fig. 13 is a detail plan view showing a portion of the type-wheel, paper strip, and adjacent parts. Fig. 14 is a detail section on line 14 14 of Fig. 5 through the head of the hammer. Fig. 15 is a detail plan view of the dash-pot valve. Fig. 16 is a detail elevation of the same. Fig. 17 is a detail elevation of the spring-motor for winding up the paper strip or tape. Fig. 18 is a detail front elevation of the device or mechanism for indicating the position of the car in respect to the scale-platform. Fig. 19 is a rear elevation of the same. Fig. 20 is a detail elevation, partly in section, of the device for indicating the position of the car in respect to the scale-platform. Fig. 21 is a section on line 21 21 of Fig. 20. Fig. 22 is a detail section on line 22 22 of Fig. 21. Fig. 23 is a detail section on line 23 23 of Fig. 21. Fig. 24 is a detail section on line 24 24 of Fig. 21. Fig. 25 is a detail section on line 25 25 of Fig. 20. Figs. 26 and 27 are detail sections on line 26 26 of Fig. 25, showing the parts in different positions. Fig. 28 is a detail plan view showing a portion of the scale-platform and adjacent track. Fig. 29 is a detail vertical cross-section on line 29 29 of Fig. 28. Fig. 30 is a vertical section on line 30 30 of Fig. 28. Fig. 31 is a section on line 31 31 of Fig. 30. Fig. 32 is a section on line 32 32 of Fig. 30; and Fig. 33 is a section on line 32 32 of Fig. 30, showing the parts in different positions from that shown in Fig. 32.

In the drawings, A represents the platform of a car-scale having railway-tracks A' thereon which connect with the rails $A^2$ of the railway-track at each end of the scale-platform, so that a train of cars may be drawn continuously over the scale-platform.

B is the scale-beam, having the customary counterbalance-weights B' $B^2$ $B^3$, which, however, are used simply for the purpose of balancing the scale and not for the purpose of weighing or indicating the load on the scale-platform.

$B^4$ is the link or connection between the scale-platform or its levers and the scale-beam B, the link $B^4$ connecting with a lever $B^5$ just beneath the scale-beam, which is connected by a link $B^6$ with the scale-beam.

The scale-beam B is furnished with an extension $B^7$, removably secured by bolts $B^8$ to the curved head $B^9$ of the scale-beam. The scale-beam B is provided near its end with a knife-edge bearing $b$, engaging a clevis $b'$, which is connected with a spring-balance C through the coupling-link $b^2$, screw-threaded swivel-coupling $b^4$, adjustable sleeve $b^5$, coupling-rod $b^6$, and rack $b^7$. The shank $b^8$ of the clevis has a slot $b^9$ to receive the coupling-link $b^2$ and a transverse pin $b^{10}$ and a hole $b^{11}$ to receive the removable coupling-pin $b^{12}$, which has a notch or groove $b^{13}$ at its end to receive the spring-retaining clamp $b^{14}$. The coupling-pin $b^{12}$ has a chain $b^{15}$, secured to the clevis $b'$ by a screw $b^{16}$. This enables the coupling-pin to be readily removed for detaching the scale-beam from the tension-spring C, while at the same time preventing the coupling-pin from becoming lost. The inclined slotted coupling-link $b^2$ is furnished with an inclined end $b^{17}$ to fit the incline $b^{18}$ in the clevis $b'$, so as to secure a rigid, accurate, and central connection between the clevis $b'$ and the coupling-link $b^2$. The coupling-link $b^2$ has a swivel connection $b^{19}$ with the screw-threaded coupling $b^4$, so that the clevis will be free to turn and prevent any binding or twisting strain.

The connecting-rod $b^6$ has a pivotal connection $b^{20}$ with the upper end of the rack $b^7$, and the rack $b^7$ is connected to the counterbalance-spring C through a screw-threaded swivel-coupling $b^{21}$, threaded plug $b^{22}$, link $b^{23}$, having knife-edge bearings $b^{24}$, a hook $b^{25}$, having knife-edge bearing $b^{26}$, the hook $b^{25}$ being integral with the spring C.

The counterbalance-spring C is connected at its lower end through an adjustable clamp C', having an eye $C^2$, through which one coil of the spring is threaded, and having dividing-finger $C^3$ and set-screw $C^4$ with a guide plug or stem $C^5$, which is secured to an adjustable bracket $C^6$, which may be adjusted up or down on the screws $C^7$ by the threaded nuts $C^8 C^9$. By turning the tension-adjusting clamp C' the operative length of the spring may be varied as desired or required. By moving the adjustable spring-bracket $C^6$ up or down the tension of the spring may be further adjusted without changing its operative length. By turning the adjustable screw-coupling $b^{21}$ the position of the rack $b^7$ in respect to the spring may be adjusted. By turning the adjustable screw-threaded coupling $b^5$ the position of the rack $b^7$ in respect to the scale-beam may be adjusted as required.

D is the weight-indicator-finger and type-wheel carrying shaft. It is furnished with a gear $d$, meshing with the rack $b^7$, so that this shaft is rotated to a greater or less extent, according to the weight or load upon the car-scale platform and the consequent corresponding tension put upon the counterbalance-spring C and resultant movement of the scale-beam B. The shaft D carries a pointer-finger E, which indicates to the attendant the weight upon the stationary circular graduated index-scale E'. The shaft D also carries the type-printing wheel F, which records the weight in connection with the stationary pointer-type F' on a paper strip or tape X.

The type-wheel and pointer-finger shaft D is journaled on antifriction-wheels D', the shafts $D^2$ of which are journaled on antifriction-wheels $D^3$, the shafts $D^4$ of which are journaled on the frame $D^5$. To keep the shaft D steadily in position between the antifriction-wheels D', I provide an adjustable overhanging hook-shaped guard $D^6$, which should be adjusted by screw $D^7$ just so it does not touch the periphery of the shaft.

The rack $b^7$ is guided as it moves up and down by a flanged wheel $D^8$, mounted on an adjustable bracket $D^9$, having an adjusting-screw $D^{10}$, so that the flanged guide-wheel may be accurately adjusted in relation to the reciprocating rack, so as to guide the same without interfering with its free movement or occasioning any friction thereon.

To steady the movement of the scale-beam and prevent vibration of the type-wheel F and of the indicator-finger E and cause the scale-beam to come over quickly to a true balance for each car as the train passes over the scale-platform without stopping, the scale-beam extension or arm $B^7$ has connected thereto the piston G of a dash-pot cylinder G', and the piston G is furnished with two upwardly-opening valves $g$ $g$ and two downwardly-opening valves $g'$ $g'$, each of the valves being of comparatively large diameter and held closed by a flat spring $g^2$, which permits the valve to open when the liquid-pressure thereon is great, so that the dash-pot piston may be moved quickly and brought to rest quickly, while at the same time steadying the movement of the piston in the dash-pot cylinder and preventing vibration or unsteady movement of the piston and of the scale-beam connected thereto.

The weight-indicating finger or pointer E and the graduated circular index E' are inclosed in a closed case $E^2$, having a glass front $E^3$ and a removable back $E^4$, so that the weight of each car may be readily observed by the attendant as the train is drawn continuously along over the scale-platform.

The type-wheel F is furnished on its periphery with a series of type or figures $f$, indicating successive weights, the intervals between successive figures being, as indicated in the drawings, two hundred pounds, the weights between such figures being approximately indicated by the position of the pointer-type F' in relation thereto and the relative position of the print of the pointer-type on the paper strip or tape in respect to the print of two adjacent number-types $f$ $f$ simultaneously made on the paper strip or tape X. The type-wheel F is a metallic wheel having a metal rim $f^3$, metal hub $f^4$, metal spokes $f^5$, and a thin copper type-strip $f^6$, secured on the peripheral face of the type-wheel rim, the series of number-types being raised or embossed type formed in the thin copper type-strip $f^6$.

The paper strip or tape X, upon which the weights of the cars of the train are successively printed or recorded as the train passes over the scale-platform A, is automatically fed from the reel or spool H, about which it is wound, to the take-up spool or reel H', upon which the printed record is wound. The paper strip or tape X in passing from the feed-spool H to take-up spool H' passes over or around the guide-rolls $H^2$ $H^3$ $H^4$, over the guide-plate $H^5$, which is preferably of wood, and over the guide-spring $H^6$. The paper strip or tape passes centrally and transversely over the type-wheel F and over the stationary pointer-type F', the pointer-type printing simply a straight line or indicator-mark $f'$, while the type-wheel prints successive numbers, as $f^2$, the units of the numbers indicating hundreds of pounds, as weights of cars are large, and it is not desired or required to have the weights of cars except two hundreds of pounds.

The take-up spool H' is rotated and the tape X thus kept under tension by a spring-motor J, which tends to constantly turn the take-up spool and does so turn it when the notched disk $H^8$ on the shaft $H^9$ of the roller $H^3$ is released or permitted to turn. The notched disk $H^8$ is normally held from rotation by a lever $H^{20}$, pivoted to the frame at $H^{10}$, and held normally in engagement with the cam or notched disk $H^8$ by a spring $H^{11}$. The lever $H^{20}$ is at each depression of the printing-hammer K disengaged from the notched cam or disk $H^8$, so as to permit the tape X to automatically feed forward the length necessary for receiving the next impression thereon by the downward stroke of the printing-lever hammer K', which strikes the free end of the lever $H^{20}$. The spring-motor J may be of any usual or well-known construction. It preferably comprises a case or frame J', spring $J^2$, shaft $J^3$, train of gears $J^4$, shaft $J^5$, train of gears $J^6$, and winding-key $J^7$.

The paper strip or tape X passes transversely over the type-wheel F and indicator-type F' and beneath the rotatable printing-disk I, having carbon-paper I' on its under surface to cause the type of the type-wheel F and indicator F' to make a distinct print or impression on the paper strip or tape X. The printing-disk I has a shaft or stud I$^2$, and it is turned or rotated by the friction of the paper strip or tape X against it as said paper strip feeds forward, the guide-spring H$^6$ pressing the paper strip against the rotatable printing-disk, so as to cause the printing-disk to turn, thus bringing a new printing-surface of the printing-disk into printing position for each impression, so that the printing-disk and paper strip will move together, thus preventing the printing-disk from smearing the paper. A cord or belt I$^4$, preferably a rubber passing around a pulley I$^5$ on the shaft I$^2$ and a pulley I$^6$ on the shaft I$^7$ of the guide-roller J$^{11}$, also communicates motion to the printing-disk.

The impression-hammer K is carried by a lever K', pivoted at K$^2$ to the frame, and it is held in its lifted position by a trigger or pawl K$^3$, which engages the notched rear end of the lever K'. The impression-hammer is actuated to strike the necessary downward blow against the type-wheel F and pointer-type F' to cause an impression to be made upon the paper strip X when the type-wheel is turned to indicate the true weight of the car on the scale-platform by a spring K$^4$, attached to the impression-hammer lever K'. The impression-hammer lever K' is automatically raised into position for operation, and the trigger holding it in its lifted position is automatically released to permit the impression-hammer to descend when each car is fully on the scale-platform and before any of the wheels of the car pass off the scale-platform and while the type-wheel is brought to a true balance, so as to indicate the true weight of the car, and before the front wheels of the next succeeding car of the train pass onto the scale-platform by two long bent or bail-shaped track-levers M M, located closely adjacent and parallel to the track-rails A' on the scale-platform and in the path of the flange of the car-wheels, so that these bent or bail levers will be depressed or actuated by the flanges of the wheels of the car as it passes along. The track-levers M, one at each end of the scale-platform, extend each for about one half its length on the scale-platform and for the other half of its length along the track-rail A$^2$ just beyond the scale-platform. Motion is communicated from the bent or bail levers M by means of a connecting-link M', bent lever M$^2$, connecting-link M$^3$, bent lever M$^4$, and connecting-link M$^5$, furnished with a compensating spring M$^6$. The connecting-link M$^5$ connects with a sliding bar M$^7$, carrying a pawl M$^8$, pivoted to said sliding bar M$^7$ by a pivot-screw M$^9$, which pawl is held in operating position by a spring M$^{10}$ to engage a ratchet-wheel M$^{11}$ on the shaft M$^{12}$, so that said shaft is turned a distance of one ratchet-tooth for each car-wheel passing over the bent or bail lever M. The shaft M$^{12}$ thus actuated is provided with a cam M$^{13}$ secured thereto, said cam being provided with one cam projection $m$ for each four teeth of the ratchet-wheel, so that the cam will be operative once to every four movements of the ratchet-wheel, the apparatus illustrated in the drawings being designed for weighing ordinary freight-cars having eight wheels, or four wheels on a side. The cam M$^{13}$ at the third movement of the ratchet M$^{11}$ operates to raise the impression-hammer through the connecting bent lever $m'$, link $m^2$, lever $m^3$, link $m^4$, lever $m^5$, link $m^6$, and bent lever $m^7$, which has a pin $m^8$ passing underneath the impression-hammer lever K'. When the impression-hammer lever is thus raised into position shown in Figs. 1 and 5 by the third movement of the ratchet M$^{11}$, it is automatically held in this position by the pawl K$^3$, and the fourth step or movement of the ratchet M$^{11}$ moves the cam M$^{13}$ out of contact with the bent lever $m'$ and allows the bent levers $m'$ and $m^7$ and their connections to return to their normal position in obedience to the spring $m^9$, so that the impression-hammer may be free to descend when released by the pawl K$^3$. Stops or buffers $m^{10}$, secured to the box or case $m^{11}$, limit the movement of the levers in one direction. The pawl K$^3$ is automatically moved to release the impression-hammer lever K' at the fourth movement or stop of the ratchet M$^{11}$ by means of the cam-wheel $m^{12}$ on the shaft M$^{12}$ operating lever $m^{13}$, connected to a link $m^{14}$ through levers $m^{15}$, link $m^{16}$, and lever $m^{17}$, which engages a pin $m^{18}$ on the pawl K$^3$, and thus moves the pawl to release said impression-hammer lever K$^3$.

To prevent overrotation of the ratchet-shaft M$^{12}$, said shaft is provided with a reverse ratchet $m^{19}$, which is engaged by a pawl $m^{20}$, pivoted to the bent lever $m^{21}$, which is pivoted at $m^{22}$ to the frame and connected at $m^{23}$ with the slide M$^7$, so that when the slide M$^7$ operates the ratchet M$^{11}$ it will through bent lever $m^{21}$ throw the pawl $m^{20}$ into engagement with the reverse ratchet $m^{19}$. To prevent any backward movement of the ratchet M$^{11}$, a pawl $m^{24}$ is provided and held in engagement with said ratchet M$^{11}$ by a spring $m^{25}$.

The track-levers M are duplicated or two in number and are located one at each end of the scale-platform, as before stated, and the ratchet mechanism above described for raising and releasing the impression-hammer is likewise duplicated, one set of this mechanism being employed for each of the track-levers M. As the two duplicate bent levers $m'$ $m'$, of each of said duplicate ratchet mechanisms are connected together by the link $m^2$, it will be seen that the impression-hammer lever K' cannot descend until both cams M$^{13}$ are moved into position for disengaging the levers $m'$ $m'$ and consequently permitting the bent lever $m^7$ to withdraw out of the way of said impression-hammer lever $K^7$ and permit its descent. In other words, the impression-hammer cannot descend to print the weight of the car until both ratchets $M^{11}$ have each been operated four times—that is to say, until the four wheels of one car passing off the scale-platform have each and all operated the track-lever M at the exit end of the scale-platform and until the four wheels of the entering car have each and all operated the bent track-lever M at the other end of the scale-platform. The impression-hammer K is preferably of metal, and it is furnished with an inner elastic or soft-rubber covering $k$ on its face and also with an outer hard-rubber or elastic covering $k'$ on its face, the same being secured thereto by clamps $k^3$ and clamp-screws $k^4$.

Each of the bent or bail-shaped track-levers M is pivoted or mounted between a pair of brackets N and N', the bracket N being secured on the scale-platform adjacent to the track-rail thereon and the bracket N' being secured to the stationary scale-frame $A^5$, surrounding the scale-platform. Each of the brackets N N' is furnished with incline-guards $n$, preferably removably secured thereto by a key or pin $n'$ to prevent the track-levers M from being injured by a broken or dragging brake beam or shoe or other part of the car being drawn along from the same. The pivot-brackets N N' for the track-levers are furnished with stop-shoulders $n^3$, which engage corresponding stop-shoulders $n^4$ on the track-levers to limit the upward movement of the track-levers M, so that the track-levers cannot project above the upper surface of the track-rails $A'$ $A^2$, and thus be liable to injury by the passage of the car-wheels over the same. The track-levers M are also preferably provided with additional stop-shoulders $n^5$, which engage the upright outer faces of the pivot-brackets N N' and serve as additional stops to limit the upward movement of the track-levers.

As the upper face of the track-levers, which is engaged by the flange of the car-wheel, is liable to wear, I preferably provide the track-levers with removable wearing-plates $n^6$, secured thereto by rivets, so that the wearing-faces of the track-levers may be renewed without throwing away the whole track-lever.

To permit trains of cars to pass over the track $A^3$ without actuating and wearing the scale mechanism when it is not desired to weigh the cars, I provide supplemental track-rails $A^6$ $A^7$, having stationary supporting-sills $A^8$ $A^8$ extending under and adjacent to the scale-platform, so that the train may be switched onto these supplemental track-rails without actuating the scale-platform.

The ratchet-shaft $M^{12}$ is provided on the outside of the inclosing case P of the ratchet mechanism with a pointer or finger P', which indicates on a dial $P^2$ the position of the wheels of the car in respect to such platform and the position of the ratchet-wheel and cam. By observing the two pointers P' of the two ratchet mechanisms it can be readily seen if the two ratchet mechanisms are in proper registry with each other. The ratchet-shaft $M^{12}$ is also provided with a handle $P^3$ for turning it by hand to adjust the two ratchet mechanisms with each other.

As freight-cars are frequently of different lengths and of different distances between wheels, to adapt the apparatus to operate automatically upon either long or short cars coupled promiscuously in the train, it is necessary to duplicate the long bent or bail-shaped track-levers M M and the ratchet mechanisms and to have the bent levers $m'$ $m'$ of the two ratchet mechanisms connected together, so that neither can operate to permit the withdrawal of the bent lever $m^7$ until both cams $M^{13}$ are turned to the same position by four wheels of one car passing off and four wheels of another car passing onto the scale-platform. The two bent track-levers M M are located far enough apart so that all four wheels of a long car may stand on the scale-platform between them without touching either, and they are at the same time located near enough together so that when a short car is located on the scale-platform the front wheel of the next car cannot touch either of said levers. By this means the apparatus is adapted to weigh both long and short cars coupled promiscuously in a train, and the printing or weight-recording mechanism is so controlled that it will only be operated when the wheels of one car are alone upon the scale-platform. In case, however, for any reason such an extremely long or extremely short car happens to be in the train that the automatic weight-recording mechanism is not adapted to automatically record its weight or in case for any reason the weight-recording mechanism should fail to properly operate the weight-indicator finger E and circular index E' will nevertheless enable the weight of the car to be secured and noted down by the attendant. The combination of the weight-indicator mechanism with the weight-recording mechanism in the automatic car-scale is thus of great utility and convenience and materially increases the efficiency of the apparatus as a whole.

As locomotives and their tenders usually have a different number of wheels from the cars and as the wheels of the locomotive and tenders are differently spaced in order to prevent the duplicate ratchet mechanisms from being thrown out of their proper relations with each other for counting and being actuated by the four wheels of the car to be weighed by the passage of an unequal number of wheels on the engine or tender over the scale-platform, I provide the operating-pawls $M^8$ of each of the ratchets M¹¹ with a device for temporarily holding said pawls out of gear or operative position in respect to said ratchets while the wheels of the locomotive or locomotive-tender are passing over the scale-platform. This pawl or gearing or disengaging device preferably consists of a pin R, having a pointed or inclined end $r$, which passes through a hole $r'$ in the slide M⁷ and enters a funnel-shaped hole $r^2$ in the pawl M⁸, and thus forces the pawl out of operative position with the ratchet. The instant all the wheels of the engine and tender pass the lever M, connected with one ratchet mechanism, and before the first or front wheel of the car engages said lever the pawl-disengaging pin R must be removed, and the same is true in relation to the pawl-disengaging pin of the other ratchet mechanism. The pawl-carrying slide M⁷ after being pulled down by the track-lever M is automatically retracted by a spring S. The track-levers M are each automatically returned to normal position after being operated upon by one wheel, so as to be ready to be again operated upon by the next wheel by means of a spring S', connected to the bent lever M by links S². The spring M⁶ compensates for any excess of movement of the track-lever M over that of the sliding bar M⁷. The type-wheel shaft D is provided with a counterweight D¹¹, connected thereto by a cord D¹², wound around the shaft to take up backlash and insure a more sensitive and accurate action of the type-wheel in responding to the weight being weighed.

I claim—

1. A combined weight-indicating and weight-recording car-scale for weighing and recording the weights of cars in motion comprising in combination, a car-scale platform having track-rails thereon, bail-shaped track-levers at each end of the scale-platform adapted to be operated by the wheels of a car, a scale-beam furnished with an extension-arm, a dash-pot cylinder having a piston connected with the scale-beam extension-arm, and furnished with upwardly and downwardly opening valves, a rotatable shaft furnished with a gear, a type-wheel on said shaft, a weight-indicator finger on said shaft, a stationary circular graduated index in coöperative relation with said finger, a stationary pointer-mark type adjacent to said type-wheel, a counterbalance tension-spring, a rack connecting the scale-beam with the spring and meshing with the gear on said shaft, an impression-hammer, an impression-hammer lever, a trigger for holding the impression-hammer lever in its lifted position, a spring for actuating the impression-hammer, a paper-strip-feed reel, take-up reel and guide-rollers, a motor for actuating the take-up reel, a notched cam-and-lever mechanism for controlling the forward feed of the paper strip by the movement of the impression-hammer lever, a printing-disk interposed between the paper strip and the impression-hammer, two pawl-carrying slides, one connected with and actuated by each of the track-levers at the ends of the scale-platform, ratchets actuated by said pawl-carrying slides, and furnished each with a cam and connecting-lever adapted to raise the impression-hammer lever after a certain number of impulses or movements of either of said ratchets, and to disengage itself from said lever on the next or fourth impulse thereof, said levers being actuated together so that the mechanism for raising the impression-hammer lever cannot be withdrawn to permit the descent of the impression-hammer until both of the ratchets have been given the required number of impulses or movements necessary to indicate that all the wheels of the car are on the scale-platform, substantially as specified.

2. In an automatic weight-recording car-scale, the combination with a scale-platform, beam and type-wheel connected thereto and operated thereby, an impression-hammer, and mechanism for automatically operating the impression-hammer when all the wheels of a car are on the scale-platform, of long bent or bail-shaped track-levers at each end of the scale-platform for actuating said mechanism, supporting-brackets for said levers and interengaging shoulders or stops on the levers and brackets for limiting the upward movement of the track-levers, substantially as specified.

3. In an automatic weight-recording car-scale, the combination with a scale-platform, a scale-beam and type-wheel connected thereto and operated thereby, an impression-hammer, and mechanism for automatically operating the impression-hammer when all the wheels of a car are on the scale-platform, of long bent or bail-shaped track-levers at each end of the scale-platform for actuating said mechanism, supporting-brackets for said levers and stop-shoulders on said levers engaging said supporting-brackets to limit the upward movement of the levers substantially as specified.

4. In an automatic weight-recording car-scale, the combination with a scale-platform, a scale-beam and a type-wheel connected thereto and operated thereby, an impression-hammer and mechanism for automatically operating the impression-hammer when all the wheels of a car are on the scale-platform, of long bent or bail-shaped track-levers at each end of the scale-platform for actuating said mechanism, supporting-brackets for said levers, said supporting-brackets having inclined guards to protect the levers from dragging parts of a car, substantially as specified.

5. In an automatic weight-recording car-scale, the combination with a scale-platform, a scale-beam and type-wheel connected thereto and operated thereby, an impression-hammer and mechanism for automatically operating the impression-hammer when all the wheels of a car are on the scale-platform, of long bent or bail-shaped track-levers at each end of the scale-platform for actuating said mechanism, supporting-brackets for said levers, said supporting-brackets having separate and removable inclined guards to protect the levers from dragging parts of a car, substantially as specified.

6. A combined weight-indicating and weight-recording car-scale for weighing and recording the weights of cars in motion, comprising in combination, a car-scale platform having track-rails thereon, bail-shaped track-levers at each end of the scale-platform adapted to be operated by the wheels of a car, a scale-beam furnished with an extension-arm, a dash-pot cylinder having a piston connected with the scale-beam extension-arm, and furnished with upwardly and downwardly opening valves, a rotatable shaft furnished with a gear, a type-wheel on said shaft, a weight-indicator finger on said shaft, a stationary circular graduated index in coöperative relation with said finger, a stationary pointer-mark type adjacent to said type-wheel, a counterbalance tension-spring, a rack connecting the scale-beam with the spring and meshing with the gear on said shaft, an impression-hammer, an impression-hammer lever, a trigger for holding the impression-hammer lever in its lifted position, a spring for actuating the impression-hammer, and connecting mechanism between said bail-shaped track-levers and the impression-hammer lever and its releasing-trigger for automatically actuating the same as the track-levers are moved by the passage of the car-wheels, substantially as specified.

7. A combined weight-indicating and weight-recording car-scale for weighing and recording the weights of cars in motion, comprising in combination, a car-scale platform having track-rails thereon, bail-shaped track-levers at each end of the scale-platform adapted to be operated by the wheels of a car, a scale-beam furnished with an extension-arm, a dash-pot cylinder having a piston connected with the scale-beam extension-arm, and furnished with upwardly and downwardly opening valves, a rotatable shaft furnished with a gear, a type-wheel on said shaft, a weight-indicator finger on said shaft, a stationary circular index in coöperative relation with said finger, a stationary pointer-mark type adjacent to said type-wheel, a counterbalance tension-spring, a rack connecting the scale-beam with the spring and meshing with the gear on said shaft, an impression-hammer, an impression-hammer lever, a trigger for holding the impression-hammer lever in its lifted position, a spring for actuating the impression-hammer, and connecting mechanism between said bail-shaped track-levers and the impression-hammer lever and its releasing-trigger for automatically actuating the same as the track-levers are moved by the passage of the car-wheels, a paper-strip-feed reel and take-up reel, a motor for actuating the take-up reel and a notched cam-and-lever mechanism for controlling the forward feed of the paper strip by the movement of the impression-hammer lever, substantially as specified.

8. A combined weight-indicating and weight-recording car-scale for weighing and recording the weights of cars in motion, comprising in combination, a car-scale platform having track-rails thereon, bail-shaped track-levers at each end of the scale-platform adapted to be operated by the wheels of a car, a scale-beam furnished with an extension-arm, a dash-pot cylinder having a piston connected with the scale-beam extension-arm, and furnished with upwardly and downwardly opening valves, a rotatable shaft furnished with a gear, a type-wheel on said shaft, a weight-indicator finger on said shaft, a stationary circular index in coöperative relation with said finger, a stationary pointer-mark type adjacent to said type-wheel, a counterbalance tension-spring, a rack connecting the scale-beam with the spring and meshing with the gear on said shaft, an impression-hammer, an impression-hammer lever, a trigger for holding the impression-hammer lever in its lifted position, a spring for actuating the impression-hammer, and connecting mechanism between said bail-shaped track-levers and the impression-hammer lever and its releasing-trigger for automatically actuating the same as the track-levers are moved by the passage of the car-wheels, a paper-strip-feed reel and take-up reel, a motor for actuating the take-up reel and a notched cam-and-lever mechanism for controlling the forward feed of the paper strip by the movement of the impression-hammer lever, and a printing-disk interposed between the paper strip and the impression-hammer, substantially as specified.

9. A combined weight-indicating and weight-recording car-scale for weighing and recording the weights of cars in motion, comprising in combination, a car-scale platform having track-rails thereon, bail-shaped track-levers at each end of the scale-platform adapted to be operated by the wheels of a car, a scale-beam furnished with an extension-arm, a dash-pot cylinder having a piston connected with the scale-beam extension-arm, and furnished with upwardly and downwardly opening valves, a rotatable shaft furnished with a gear, a type-wheel on said shaft, a weight-indicator finger on said shaft, a stationary circular graduated index in coöperative relation with said finger, a stationary pointer-mark type adjacent to said type-wheel, a counterbalance tension-spring, a rack connecting the scale-beam with the spring and meshing with the gear on said shaft, an impression-hammer, an impression-hammer lever, a trigger for holding the impression-hammer lever in its lifted position, a spring for actuating the impression-hammer, and connecting mechanism between said bail-shaped track-levers and the impression-hammer lever and its releasing-trigger for automatically actuating the same as the track-levers are moved by the passage of the car-wheels, a paper-strip-feed reel and take-up reel, a motor for actuating the take-up reel and a notched cam-and-lever mechanism for controlling the forward feed of the paper strip by the movement of the impression-hammer lever, and a rotatable printing-disk interposed between the paper strip and the impression-hammer and a spring for pressing the paper strip against the printing-disk to cause the printing-disk to rotate by the forward feed of the paper strip, substantially as specified.

10. In an automatic weight-recording scale, the combination with a scale-platform and scale-beam, of track-levers at each end of the scale-platform, a counterbalance-spring, a rack connected with the scale-beam and spring, a rotatable shaft having a gear meshing with said rack, a type-wheel on said shaft, a stationary pointer-mark type adjacent to said type-wheel, an impression-hammer, an impression-hammer lever, mechanism for operating said impression-hammer automatically from the track-levers, a paper-strip-feed mechanism and a printing-disk rotated by the forward feed of the paper strip, substantially as specified.

11. In an automatic weight-recording scale, the combination with a scale-platform and scale-beam, of track-levers at each end of the scale-platform, a counterbalance-spring, a rack connected with the scale-beam and spring, a rotatable shaft having a gear meshing with said rack, a type-wheel on said shaft, a stationary pointer-mark type adjacent to said type-wheel, an impression-hammer, an impression-hammer lever, mechanism for operating said impression-hammer automatically from the track-levers, a paper-strip-feed mechanism and a printing-disk rotated by the forward feed of the paper strip, said paper-strip-feed mechanism having a notched cam or disk and a lever engaged by the impression-hammer lever to control the feed of the paper by the movement of the impression-hammer lever, substantially as specified.

12. In a combined weight-indicating and weight printing or recording scale, the combination with a scale-beam, of a dash-pot cylinder having a piston connected to the scale-beam and furnished with upwardly and downwardly opening valves, a counterbalance-spring connected to the scale-beam, a rack connected to the scale-beam and counterbalance-spring, a shaft furnished with a gear meshing with said rack, a type-wheel on said shaft, a stationary pointer-mark type adjacent to said wheel, an impression-hammer, a weight-indicator finger on said shaft and a circular index or dial coöperating with said indicator-finger, a scale-platform having track-rails thereon, long bail-shaped track-levers at each end of said scale-platform in the path of the car-wheels, and connecting mechanism for operating the impression-hammer automatically from said track-levers, substantially as specified.

13. In a combined weight-indicating and weight printing or recording scale, the combination with a scale-beam, of a dash-pot cylinder having a piston connected to the scale-beam and furnished with upwardly and downwardly opening valves, a counterbalance-spring connected to the scale-beam, a rack connected to the scale-beam and counterbalance-spring, a shaft furnished with a gear meshing with said rack, a type-wheel on said shaft, a stationary pointer-mark type adjacent to said wheel, an impression-hammer and weight-indicator finger on said shaft and a circular index or dial coöperating with said indicator-finger, a scale-platform having track-rails thereon, long bail-shaped track-levers at each end of said scale-platform in the path of the car-wheels and connecting mechanism for operating the impression-hammer automatically from said track-levers, and supporting-brackets for said track-levers, said track-levers having stop-shoulders engaging said supporting-brackets to limit their upward movement, substantially as specified.

14. In an automatic weight-indicating and weight-recording car-scale, the combination with a scale-platform having track-rails thereon, of long bail-shaped track-levers at each end of the scale-platform, a scale-beam, a dash-pot cylinder having a piston connected to the scale-beam and furnished with upwardly and downwardly opening valves, a counterbalance-spring connected to the scale-beam, a rack connected to the scale-beam, and counterbalance-spring, a shaft furnished with a gear meshing with said rack, a rotatable weight-indicator finger, a stationary index or dial coöperating therewith, a rotatable type-wheel, a stationary pointer-mark type adjacent thereto, an impression-hammer, an impression-hammer lever, a trigger for holding said impression-hammer lever in its lifted position, and connecting mechanism between each of said track-levers and said impression-hammer lever and trigger for actuating the same by the movement of the car-wheels, substantially as specified.

15. In an automatic weight-indicating and weight-recording car-scale, the combination with a scale-platform having track-rails thereon, of long bail-shaped track-levers at each end of the scale-platform, a scale-beam, a dash-pot cylinder having a piston connected to the scale-beam and furnished with upwardly and downwardly opening valves, a counterbalance-spring connected to the scale-beam, a rack connected to the scale-beam and counterbalance-spring, a shaft furnished with a gear meshing with said rack, a rotatable weight-indicator finger, a stationary index or dial cooperating therewith, a rotatable type-wheel, a stationary pointer-mark type adjacent thereto, an impression-hammer, an impression-hammer lever, a trigger for holding said impression-hammer lever in its lifted position, and connecting mechanism between each of said track-levers and said impression-hammer lever and trigger for actuating the same by the movement of the car-wheels, and a paper-strip-feed mechanism, substantially as specified.

16. In an automatic weight-indicating and weight-recording car-scale, the combination with a scale-platform having track-rails thereon, of long bail-shaped track-levers at each end of the scale-platform, a scale-beam, a dash-pot cylinder having a piston connected to the scale-beam and furnished with upwardly and downwardly opening valves, a counterbalance-spring connected to the scale-beam, a rack connected to the scale-beam and counterbalance-spring, a shaft furnished with a gear meshing with said rack, a rotatable weight-indicator finger, a stationary index or dial cooperating therewith, a rotatable type-wheel, a stationary pointer-mark type adjacent thereto, an impression-hammer, an impression-hammer lever, a trigger for holding said impression-hammer lever in its lifted position, and connecting mechanism between each of said track-levers and said impression-hammer lever and trigger for actuating the same by the movement of the car-wheels, a paper-strip-feed mechanism and a printing-disk, substantially as specified.

17. In an automatic weight-indicating and weight-recording car-scale, the combination with a scale-platform having track-rails thereon, of long bail-shaped track-levers at each end of the scale-platform, a scale-beam, a dash-pot cylinder having a piston connected to the scale-beam and furnished with upwardly and downwardly opening valves, a counterbalance-spring connected to the scale-beam, a rack connected to the scale-beam and counterbalance-spring, a shaft furnished with a gear meshing with said rack, a rotatable weight-indicator finger, a stationary index or dial cooperating therewith, a rotatable type-wheel, a stationary pointer-mark type adjacent thereto, an impression-hammer, an impression-hammer lever, a trigger for holding said impression-hammer lever in its lifted position, and connecting mechanism between each of said track-levers and said impression-hammer lever and trigger for actuating the same by the movement of the car-wheels, a paper-strip-feed mechanism, a printing-disk and a spring pressing the paper strip against the printing-disk to cause the printing-disk to be rotated by the paper strip, substantially as specified.

18. In an automatic weight-recording car-scale, the combination with a scale-platform, of track-levers at each end of the scale-platform, a scale-beam, a counterbalance-spring, a rack, a rotatable shaft having a gear meshing with said rack, an impression-hammer, an impression-hammer-lever mechanism for operating the impression-hammer lever from the track-levers, a stationary pointer-mark type and a metallic type-wheel on said shaft having a metal rim, metal hub and metal spokes, and a thin copper type-strip on the peripheral face of the type-wheel rim, substantially as specified.

19. In an automatic weight-recording car-scale, the combination with a scale-platform, of track-levers at each end of the scale-platform, a scale-beam, a counterbalance-spring, a rack, a rotatable shaft having a gear meshing with said rack, an impression-hammer, an impression-hammer lever, mechanism for operating the impression-hammer lever from the track-levers, a stationary pointer-mark type and a metallic type-wheel on said shaft having a metal rim, metal hub and metal spokes, and a thin copper type-strip on the peripheral face of the type-wheel rim, and mechanism for controlling the feed of the paper strip by the movement of the impression-hammer, substantially as specified.

20. In an automatic weight-recording car-scale, the combination with a scale-platform, of track-levers at each end of the scale-platform, a scale-beam, a counterbalance-spring, a rack, a rotatable shaft having a gear meshing with said rack, an impression-hammer, an impression-hammer lever, mechanism for operating the impression-hammer lever from the track-levers, a stationary pointer-mark type and a metallic type-wheel on said shaft having a metal rim, metal hub and metal spokes, and a thin copper type-strip on the peripheral face of the type-wheel rim, and mechanism for controlling the feed of the paper strip by the movement of the impression-hammer, and a printing-disk, substantially as specified.

21. In an automatic weight-recording car-scale, the combination with a scale-platform, of track-levers at each end of the scale-platform, a scale-beam, a counterbalance-spring, a rack, a rotatable shaft having a gear meshing with said rack, an impression-hammer, an impression-hammer-lever mechanism for operating the impression-hammer lever from the track-levers, a stationary pointer-mark type and a metallic type-wheel on said shaft having a metal rim, metal hub and metal spokes, and a thin copper type-strip on the peripheral face of the type-wheel rim, and mechanism for controlling the feed of the paper strip by the movement of the impression-hammer, a printing-disk, and a spring for pressing the paper strip against the printing-disk to cause the printing-disk to be rotated by the forward feed of the paper strip, substantially as specified.

22. In an automatic weight-recording car-scale, the combination with a scale-platform having track-rails thereon, of long track-levers one at each end of the scale-platform, and extending each partly on the scale-platform and partly along the connecting track-rails, supporting-brackets for said track-levers and stop-shoulders on the track-levers engaging said supporting-brackets, substantially as specified.

23. In an automatic weight-recording car-scale, the combination with a scale-platform having track-rails thereon, of track-levers adjacent to the track-rails and extending partly on the scale-platform and partly on the surrounding stationary frame, supporting-brackets for said track-levers and interengaging shoulders on the track-levers and supporting-brackets to limit the upward movement of the track-levers, substantially as specified.

24. In an automatic weight-recording car-scale, the combination with a scale-platform having track-rails thereon, of track-levers adjacent to the track-rails and extending partly on the scale-platform and partly on the surrounding stationary frame, supporting-brackets for said track-levers and interengaging shoulders on the track-levers and supporting-brackets to limit the upward movement of the track-levers, said supporting-brackets having inclined guards, substantially as specified.

25. In an automatic weight-recording car-scale, the combination with a scale-platform having track-rails thereon, of track-levers adjacent to the track-rails and extending partly on the scale-platform and partly on the swinging stationary frame, supporting-brackets for said track-levers and interengaging shoulders on the track-levers and supporting-brackets to limit the upward movement of the track-levers, said supporting-brackets having separate, removable inclined guards, substantially as specified.

26. In an automatic weight-recording car-scale, the combination with a scale-platform having track-rails thereon, of track-levers one at each end of the scale-platform, and supporting-brackets for the track-levers furnished with inclined guards, substantially as specified.

27. In an automatic weight-recording car-scale, the combination with a scale-platform, having track-rails thereon, of track-levers, one at each end of the scale-platform, and supporting-brackets for the track-levers furnished with removable inclined guards, substantially as specified.

28. In an automatic weight-recording car-scale, the combination with a scale-platform, of track-levers, one at each end of the scale-platform, provided with removable wearing-plates to engage the flanges of the car-wheels, substantially as specified.

GEORGE GOETZ.

Witnesses:
H. M. MUNDAY,
P. ABRAMS.